United States Patent [19]
Wu et al.

[11] Patent Number: 6,097,518
[45] Date of Patent: Aug. 1, 2000

[54] N X M OPTICAL WAVELENGTH ROUTING SWITCH

[75] Inventors: Kuang-Yi Wu; Jian-Yu Liu, both of Boulder, Colo.

[73] Assignee: Chorum Technologies Inc., Richardson, Tex.

[21] Appl. No.: 09/037,937

[22] Filed: Mar. 10, 1998

Related U.S. Application Data

[63] Continuation-in-part of application No. 08/739,424, Oct. 29, 1996.
[60] Provisional application No. 60/043,012, Apr. 15, 1997.

[51] Int. Cl.⁷ .................................................. H04J 14/02
[52] U.S. Cl. ........................................... 359/128; 359/122
[58] Field of Search .................... 359/128, 122, 359/117, 129–130, 156, 39

[56] References Cited

U.S. PATENT DOCUMENTS

| | | | |
|---|---|---|---|
| 4,919,522 | 4/1990 | Nelson | 350/389 |
| 5,194,977 | 3/1993 | Nishio | 359/128 |
| 5,363,228 | 11/1994 | DeJule et al. | 319/117 |
| 5,381,250 | 1/1995 | Meadows | 359/39 |
| 5,414,540 | 5/1995 | Patel et al. | 359/39 |
| 5,414,541 | 5/1995 | Patel et al. | 359/39 |
| 5,488,500 | 1/1996 | Glance | 359/127 |
| 5,606,439 | 2/1997 | Wu | 349/117 |
| 5,694,233 | 12/1997 | Wu et al. | 319/117 |

*Primary Examiner*—Kinfe-Michael Negash
*Attorney, Agent, or Firm*—Dorr, Carson, Sloan & Birney, P.C.

[57] ABSTRACT

A switchable wavelength router switches wavelength division multiplexed (WDM) optical signals between N input ports and M output ports. Each WDM signal is spatially decomposed into N pairs of orthogonally polarized beams by a polarization-dependent routing element, such as a birefringent element. A polarization rotator array rotates the polarization of each beam pair so that both beams in each pair have the same polarization. A wavelength filter then demultiplexes each beam pair to create N sets of four beams, such that the first beam in each pair decomposes into third and fourth orthogonally-polarized beams, and the second beam in each pair decomposes into fifth and sixth orthogonally-polarized beams. The third and fifth beams carry a first spectral band at a first polarization, and the fourth and sixth beams carry a second complementary spectral band at an orthogonal polarization. A second polarization-dependent routing element spatially routes the four beams in each of the N sets based on their polarizations, and also spatially combines selected beam pairs from different sets to produce M pairs of beams. A second polarization rotator array restores each beam pair to orthogonal polarization, and a final polarization-dependent routing element recombines each beam pair to produce M output beams at the output ports.

19 Claims, 13 Drawing Sheets

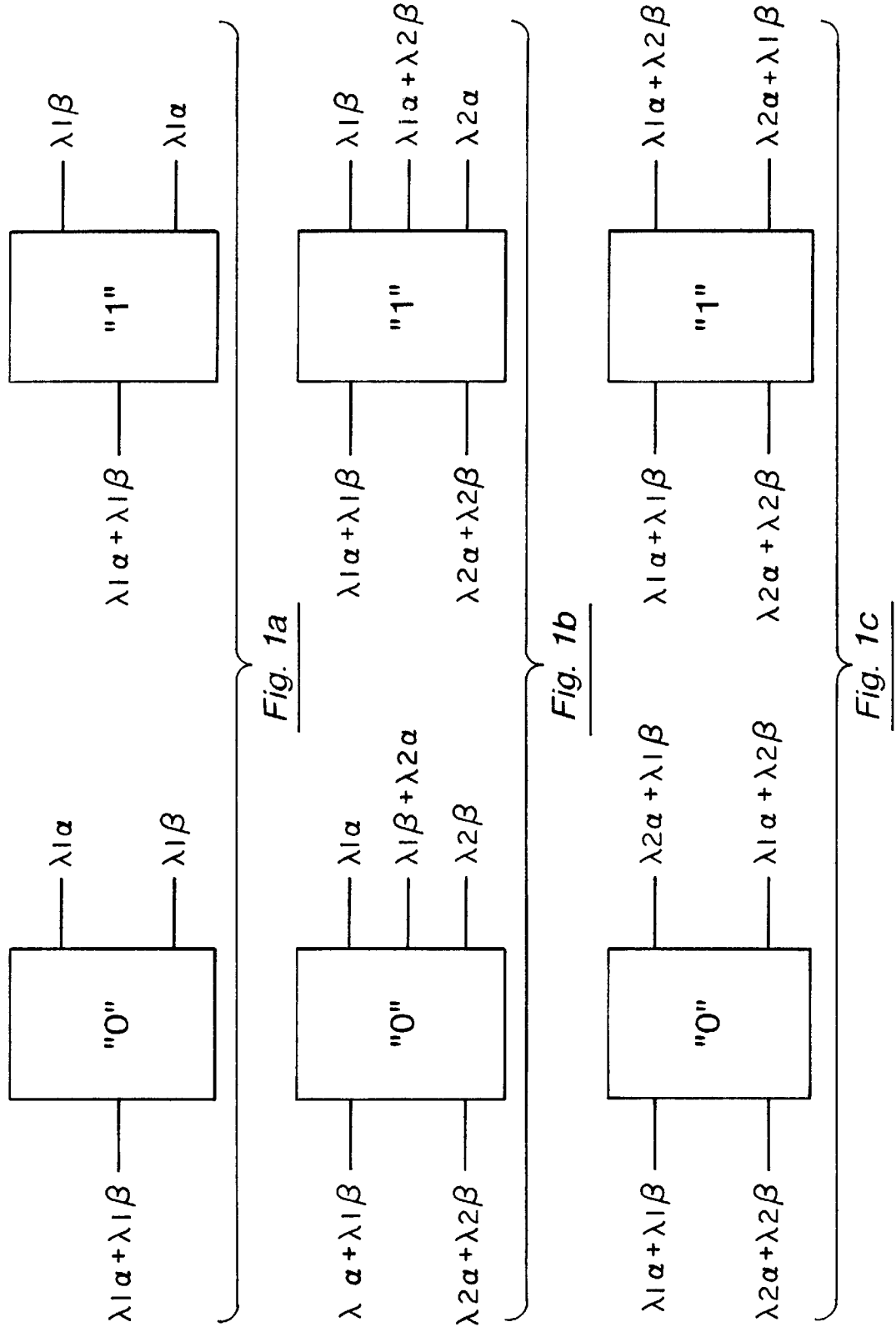

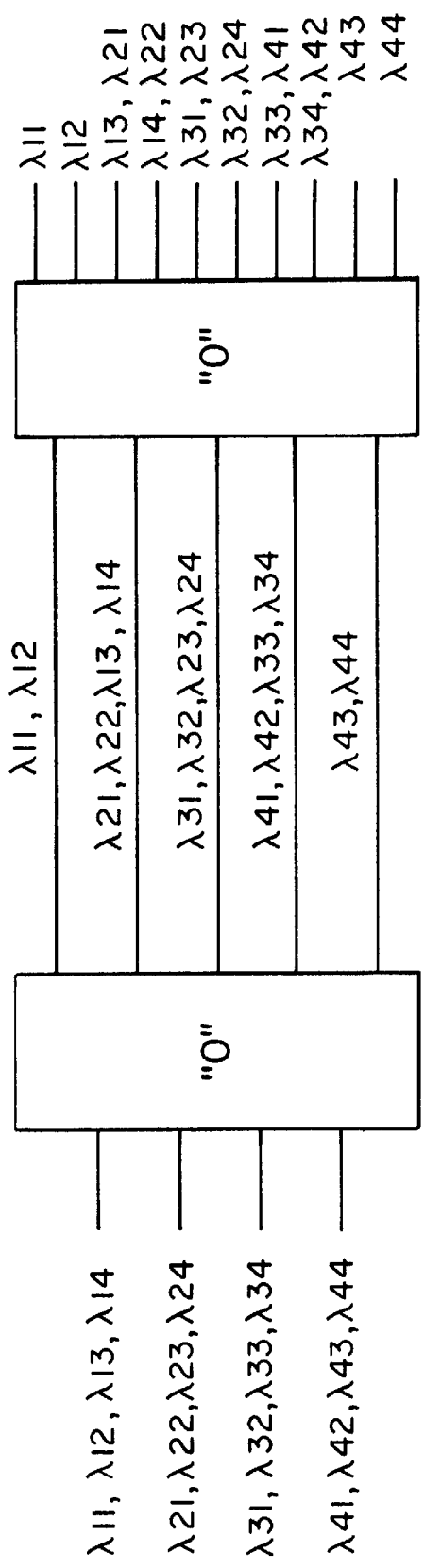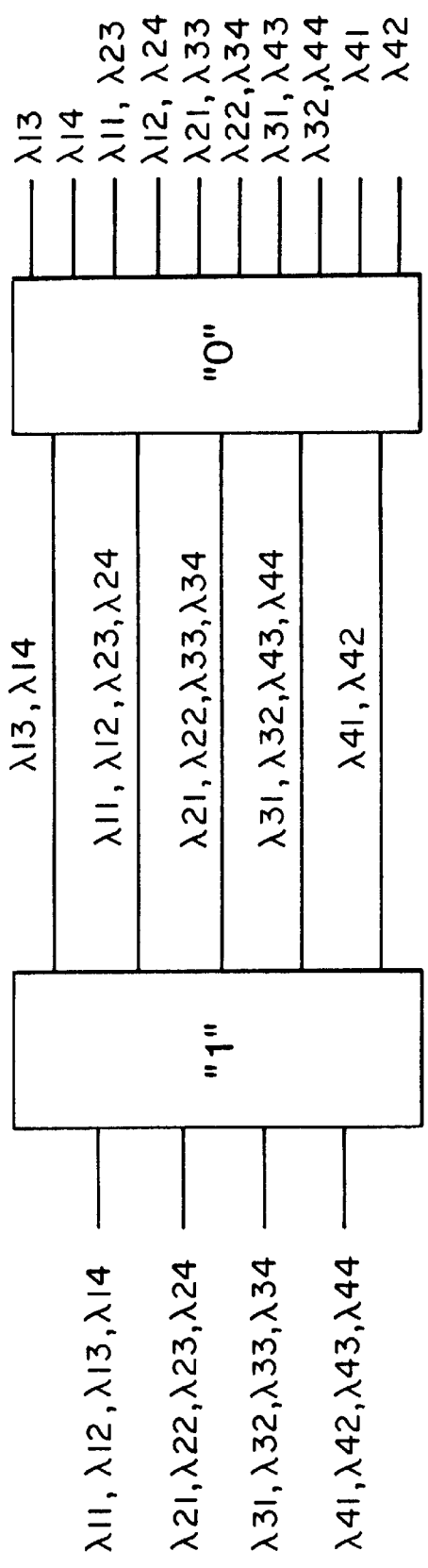
Fig. 4a
Fig. 4b

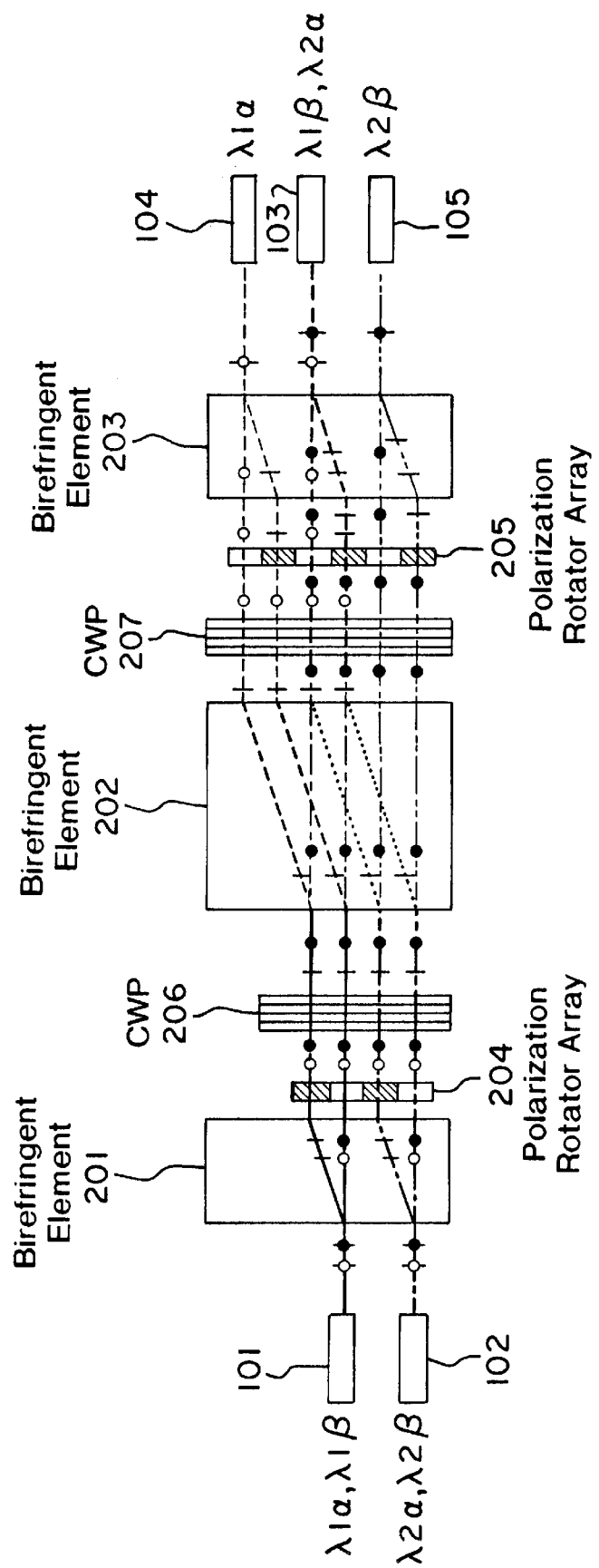

6,097,518

N X M OPTICAL WAVELENGTH ROUTING SWITCH

RELATED APPLICATION

The present patent application is based on the Applicants' U.S. Provisional Patent Application Ser. No. 60/043,012, entitled "N×M Optical Wavelength Routing Switch," filed Apr. 15, 1997. The present application is also a continuation-in-part of the Applicants' co-pending U.S. patent application Ser. No. 08/739,424, entitled "Programmable Wavelength Router," filed on Oct. 29, 1996.

BACKGROUND OF THE INVENTION

1. Field of the Invention

The present invention relates generally to the field of optical communication systems. More particularly, the present invention provides an N×M optical wavelength router for wavelength division multiplex (WDM) optical communications.

2. Statement of the Problem

Optical wavelength division multiplexing (WDM) has become the standard technique to fully utilize the high bandwidth provided by optical fibers. WDM systems employ signals consisting of a number of different wavelength optical signals, known as carrier signals or channels, to transmit information on an optical fiber. Each carrier signal is modulated by one or more information signals. As a result, a significant number of information signals may be simultaneously transmitted over a single optical fiber using WDM technology.

Despite the substantially higher fiber bandwidth utilization provided by WDM technology, a number of serious problems must be overcome if these systems are to become commercially viable (e.g., multiplexing, demultiplexing, and routing optical signals). The addition of the wavelength domain increases the complexity for network management because processing now involves both filtering and routing. Multiplexing is the process of combining multiple channels each defined by its own frequency spectrum into a single WDM signal. Demultiplexing is the opposite process in which a single WDM signal is decomposed into the individual channels. The individual channels are spatially separated and coupled to specific output ports. Routing differs from demultiplexing in that a router spatially separates the input optical channels into output ports and permutes these channels according to control signals to provide a desired coupling between an input channel and a specified output port.

One prior approach to wavelength routing has been to demultiplex the WDM signal into a number of component signals using a prism or diffraction grating. The component signals are each coupled to a plurality of 2×2 optical switches that are usually implemented using opto-mechanical switches. Optionally, a signal to be added to the WDM signal is coupled to one of the 2×2 switches. One output port of each 2×2 optical switch is coupled to a first multiplexer (the retained output multiplexer) that combines the retained signals and the added signal. A second signal from each 2×2 optical switch is coupled to a second multiplexer (the dropped signal multiplexer). By proper configuration of the optical switches, one signal can be coupled to the output port of the second multiplexer, while all the remaining signals pass through the output port of the first multiplexer. This structure is also known as an add-drop optical filter. The structure is complicated, relies on opto-mechanical switches, and interconnections tend to be difficult.

A second type of wavelength-selectable space switch is shown in U.S. Pat. No. 5,488,500 (Glance). The Glance filter provides the advantage of arbitrary channel arrangement but suffers significant optical coupling loss because of the two array waveguide grating (AWG) demultiplexers and two couplers used in the structure. Array waveguide gratings are one of the most popular technique in processing the WDM signals. This technology is based on planar waveguide silicon processing and has been widely adopted by the fiber optics industry. However, AWG is fundamentally passive, in that the output wavelength distribution is fixed by the WDM signals that are input at the input port. To perform the exchange of optical channels (i.e., routing), optical switches are needed and the required cascading of filters and switches makes this type of wavelength router cumbersome.

Another problem with prior approaches and with optical signal processing in general is high cross-talk between channels. Cross-talk occurs when optical energy from one channel causes a signal or noise to appear on another channel. Cross-talk must be minimized to provide reliable communication. Also, filters used in optical routing are often polarization dependent. The polarization dependency usually causes higher cross-talk as optical energy of particular polarization orientations may leak between channels or be difficult to spatially orient so that it can be properly launched into a selected output port. Similarly, optical filters provide imperfect pass band performance in that they provide too much attenuation, or signal compression at side lobes of the pass band is not high enough.

All of these shortcomings lead to imperfect or inefficient data communication using optical signals. What is needed is a routing structure that provides low cross-talk to eliminate unnecessary interference from other channels in a large network, flat pass band response in the optical spectrum of interest so that the wavelength router can tolerate small wavelength variations due to laser wavelength drift, polarization insensitivity, and moderate to fast switching speed for network routing. Also, a router with low insertion loss is desirable so that the router will minimally impact the network and limit the need for optical amplifiers.

SUMMARY OF THE INVENTION

The present invention provides an N×M wavelength router switch having a plurality of cascaded stages in which each stage receives one or more optical signals carrying a plurality of wavelength division multiplexed (WDM) channels. Each stage divides the received optical signals into two complimentary subsets of the channels and spatially positions the divided optical signals in response to a control signal applied to each stage.

BRIEF DESCRIPTION OF THE DRAWINGS

FIGS. 1a through 1c are block diagrams demonstrating the functionality of 1×2, 2×3 and 2×2 optical wavelength router switches in accordance with the present invention.

FIGS. 4a through 4d simplified block diagrams illustrating a cascaded wavelength switch in which 4×5 and 5×10 wavelength routers are used to create a 4×10 wavelength switch. The corresponding wavelengths routed to the output ports are illustrated in FIGS. 4a through 4d according to the control signals applied to each stage.

FIGS. 5a and 5b are simplified block diagrams of a 2×3 wavelength switch in a two-dimensional design showing the "0" and "1" control states, respectively. The light paths for each wavelength set and their states of polarization are shown in the inserts.

DETAILED DESCRIPTION OF THE DRAWING

1. N×M Wavelength Routing Blocks.

The preferred implementation of the present invention both demultiplexes (i.e., spectrally separates) and routes (i.e., spatially switches) wavelength division multiplexed (WDM) optical signals. FIGS. 1a through 1c are block diagrams illustrating the general functionality of the present invention for 1×2, 2×3, and 2×2 wavelength switches, respectively. A WDM signal typically has multiple channels, with each channel having its own range of wavelengths or frequencies. As used herein, the term "channel" refers to a particular range of frequencies or wavelengths that define a unique information signal.

Figure 2B:
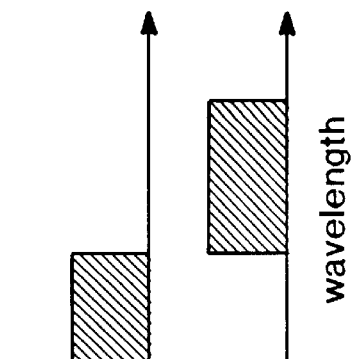
FIGS. 2a through 2d are diagrams illustrating examples of complementary spectra used in accordance with the present invention.
Figure 2D:
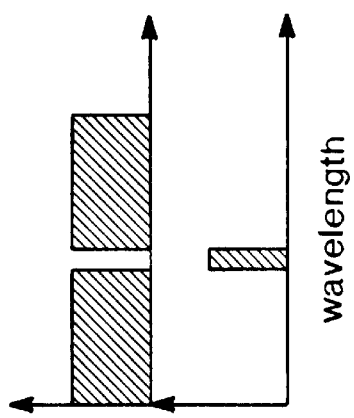
Figure 2A:
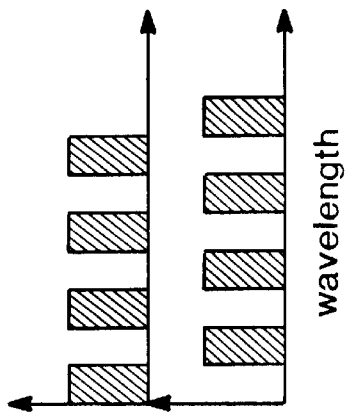
Figure 2C:
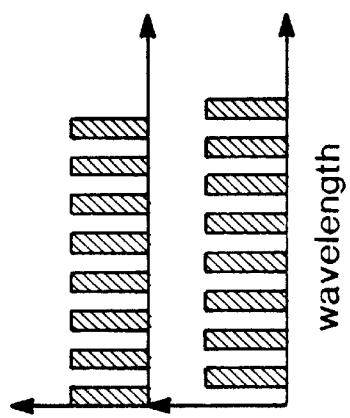
Figure 2:
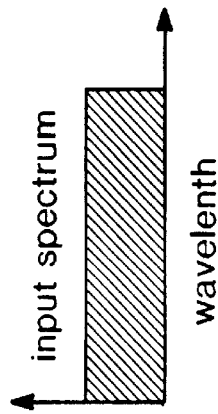

In FIGS. 1a–1c, the designation $\lambda ij$ is used to represent the optical wavelengths where i=1, 2, designate the port number of the input WDM signal and j=$\alpha,\beta$, designate the subset wavelengths of the input spectrum. It should be noted that, $\lambda i\alpha$ and $\lambda i\beta$ are complementary to each other as shown in FIG. 2. For example, $\lambda 1\alpha$ and $\lambda 1\beta$ constitute the entire WDM signal input at port 1.

In each of the wavelength switches shown in FIGS 1a–1c, there are two control states for the switch, namely, "0" and "1." For the "0" control state shown in FIG. 1a, the input spectrum is split into two sub-spectra $\lambda 1\alpha$ and $\lambda 1\beta$ and are directed to the two output ports. When the control signal is switched to the "1" control state, the two spectra exchange positions and exit at the opposite ports.

Similarly, in FIG. 1b, two optical WDM inputs are fed into the 2×3 wavelength switch. For the "0" control state, $\lambda 1\alpha$ and $\lambda 1\beta$ go to output ports 1 and 2, and $\lambda 2\alpha$ and $\lambda 2\beta$ go to output ports 2 and 3. When the control signal is switched to "1", the spectra flip. In this case, $\lambda 1\alpha$ and $\lambda 1\beta$ go to output ports 2 and 1, and $\lambda 2\alpha$ and $\lambda 2\beta$ go to output ports 3 and 2, respectively. Finally, in the case of FIG. 1c, the 2×2 wavelength switch splits the spectra into two complementary subsets that are routed according to the control bit.

Figure 3A:
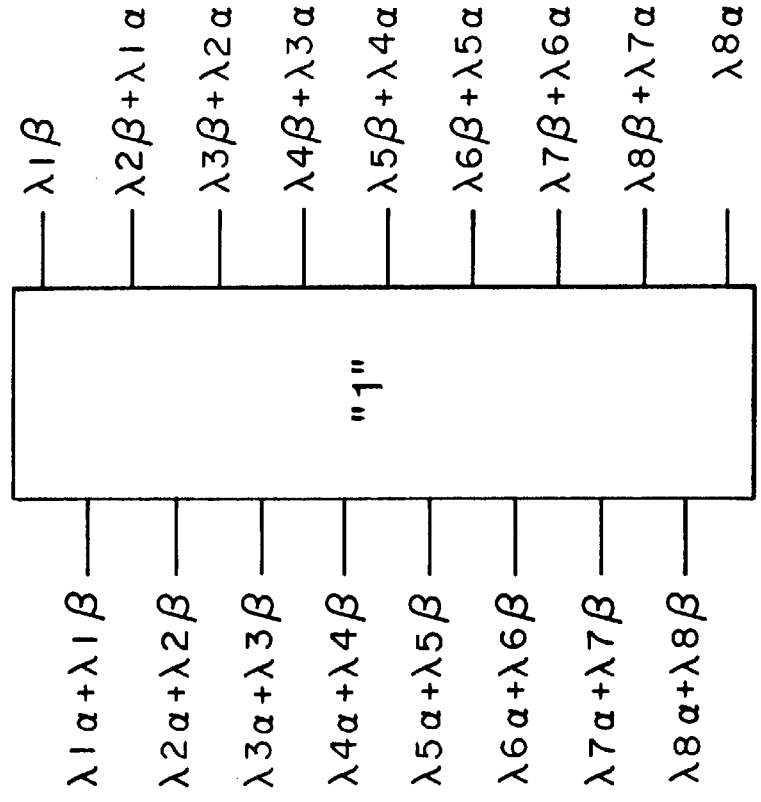
FIGS. 3a and 3b are block diagrams of a 8×9 wavelength router in the "0" and "1" control states, respectively.
Figure 3B:
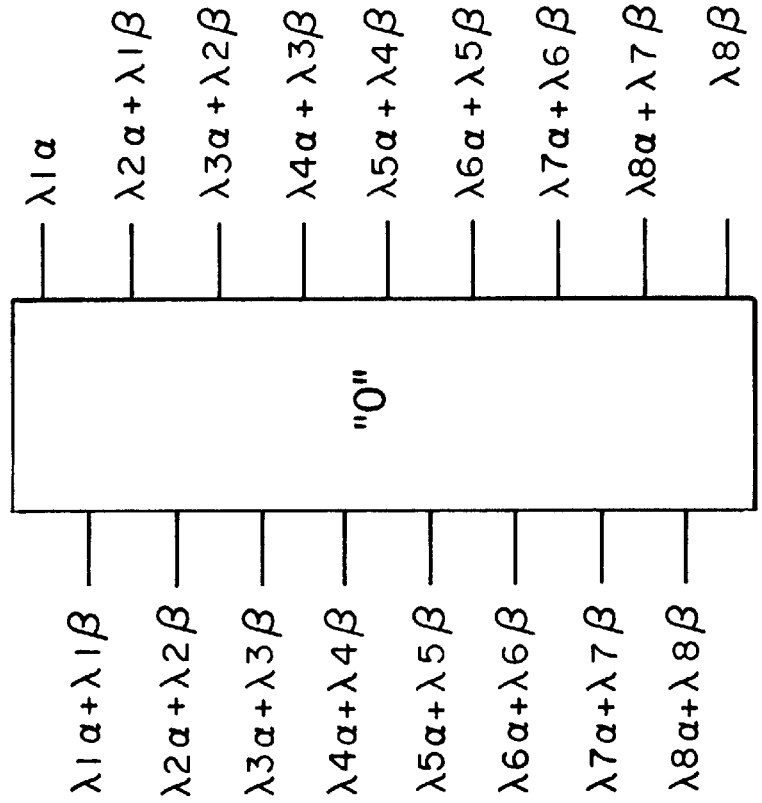
Figure 4C:
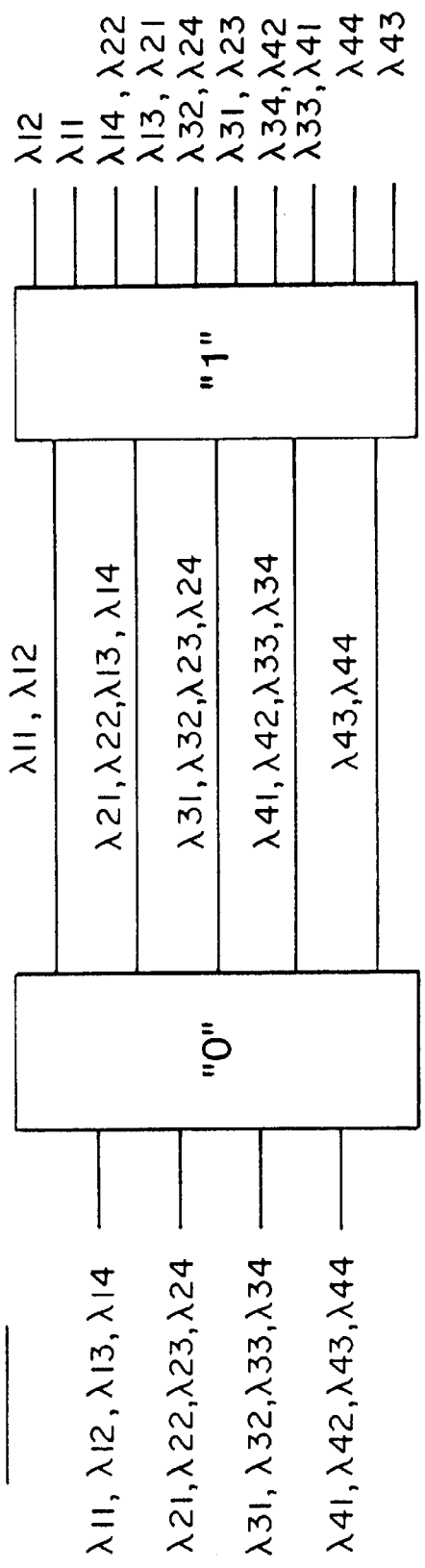
Figure 4D:
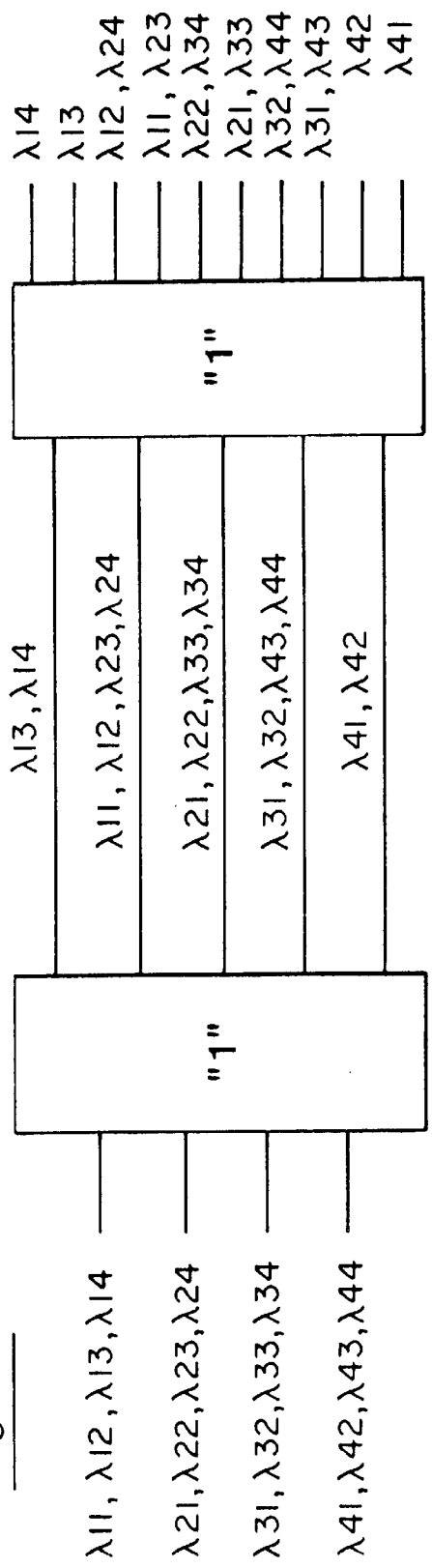

Further expansion of the basic wavelength switch to a larger scale is shown in FIGS. 3a–3b and 4a–4d, in which an 8×9 and a 4×10 wavelength switch are shown. In FIGS. 3a and 3b, eight optical WDM signals are input to the wavelength router, these eight WDM signals are then split into two complementary subsets and routed to the nine output ports. When the control bit switches from "0" to "1", the two adjacent ports exchange optical channels. The results of the wavelength arrangements are that ($\lambda 1\alpha$, $\lambda 2\alpha$, $\lambda 3\alpha$, $\lambda 4\alpha$, $\lambda 5\alpha$, $\lambda 6\alpha$, $\lambda 7\alpha$, $\lambda 8\alpha$) are routed to output ports 1 through 8 and ($\lambda 1\beta$, $\lambda 2\beta$, $\lambda 3\beta$, $\lambda 4\beta$, $\lambda 5\beta$, $\lambda 6\beta$, $\lambda 7\beta$, $\lambda 8\beta$) are routed to output ports 2 through 9 for the "0" control state.($\lambda 1\beta$, $\lambda 2\beta$, $\lambda 3\beta$, $\lambda 4\beta$, $\lambda 5\beta$, $\lambda 6\beta$, $\lambda 7\beta$, $\lambda 8\beta$) are routed to output ports 1 through 8 and ($\lambda 1\alpha$, $\lambda 2\alpha$, $\lambda 3\alpha$, $\lambda 4\alpha$, $\lambda 5\alpha$, $\lambda 6\alpha$, $\lambda 7\alpha$, $\lambda 8\alpha$) are routed to output ports 2 through 9 for the "1" control state.

In the case of FIGS. 4a–4d, a 4×10 wavelength switch is created by cascading a 4×5 wavelength switch and a 5×10 wavelength switch. The four states of operation with control bits of (0, 0), (0, 1), (1, 0), and (1, 1) with the corresponding wavelength outputs are shown in FIG. 4a through 4d, respectively. The versatile design of the wavelength switches can be seen from these two examples based on the present invention.

2. 2-D Design of a 2×3 Wavelength Router Switch.

Figure 5B:
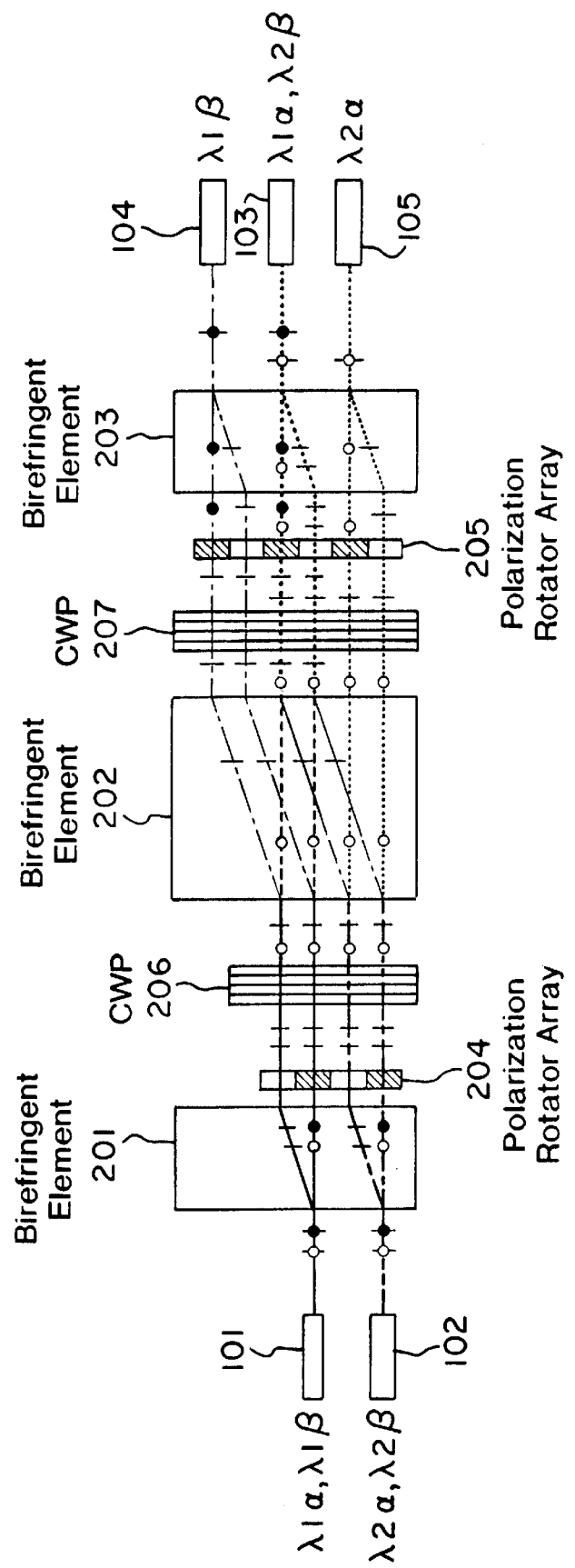

FIG. 5 is a simplified block diagram for a 2×3 wavelength router. Bold-solid lines indicate the optical paths carrying the full spectrum of channels, $\lambda 1\alpha$ and $\lambda 1\beta$, in the WDM signal at the first input port 101. Bold-intermittent lines indicate the full spectrum of channels (i.e., $\lambda 2\alpha$ and $\lambda 2\beta$) in the WDM signal at the second input port 102. Sold-dashed lines indicate the mixed channels from first input port and second input port, i.e., ($\lambda 1\alpha$, $\lambda 2\beta$) or ($\lambda 2\alpha$, $\lambda 1\beta$) for the case of FIG. 5a or 5b, respectively. Thin long-dashed lines indicate the optical paths of signals comprising a first subset of channels from the input port 1 (i.e., $\lambda 1\alpha$). Thin short-dashed lines indicate the optical channels carrying a first subset of channels from input port 2 (i.e., $\lambda 2\alpha$). Thin-intermittent lines indicate the optical paths of WDM signals carrying a second, complimentary subset of channels from input port 1 (i.e., $\lambda 1\beta$). Thin-solid lines indicate the optical channels comprising a second, complimentary subset of channels from input port 2 (i.e., $\lambda 2\beta$). It is important to understand that each of the subsets may comprise more than one channel and may itself be a WDM signal although having a smaller bandwidth than the original WDM signals 101, 102.

Each of the lines are labeled with filled or unfilled circles indicating vertical polarization for the optical channels. Short lines attached to the optical paths indicate horizontal polarization in the optical signal at that point. These lines and symbols are further explained in the insert in FIGS. 5a and 5b.

The WDM signals 101, 102 enter a first polarization separation element 201 that spatially separates the horizontally and vertically polarized components of the WDM signal 101. This element 201 is made of a birefringent material that allows the vertically polarized portion of the optical signal to pass through without changing course because they are ordinary waves in the material. In contrast, horizontally polarized waves are redirected at an angle because of the birefringent walk-off effect. The angle of redirection is a well-known function of the particular materials chosen. Examples of materials suitable for construction of the birefringent elements used in the preferred embodiments include calcite, rutile, lithium niobate, $YVO_4$-based crystals, and the like. Although a birefringent crystal is used in the preferred embodiment, a similar function can be achieved through the use of a polarization beam splitter combined with a prism.

Both the horizontally and vertically polarized components are coupled to a first array of polarization rotators 204 under control by a control bit. The first polarization rotator array 204 is divided into four elements that serve to selectively rotate the polarization of each of beams by a predefined amount. In the preferred embodiment, the first rotator array 204 rotates the polarization of each beam by either 0° (i.e., no rotation) or 90°.

The first polarization rotator array 204 can be made of one or more types of known elements including twisted nematic liquid crystal rotators, parallel aligned nematic liquid crystal rotators, ferroelectric liquid crystal rotators, pi-cell based liquid crystal rotators, magneto-optic based Faraday rotators, acousto-optic and electro-optic based polarization rotators. Commercially available rotators based on liquid crystal technology are preferred, although other rotator technologies may be applied to meet the needs of a particular application. The switching speeds of these elements ranges from a few milliseconds to nanoseconds, and therefore can be applied to a wide variety of systems to meet the needs of a particular application. These and similar basic elements are considered equivalents and may be substituted and interchanged without departing from the spirit of the present invention.

FIG. 5a illustrates the control state in which the polarizations of the two horizontally-polarized beams are rotated by 90°, so that all four beams exiting the first rotator array 204 are vertically polarized. FIG. 5b illustrates the second control state in which the polarizations of the two vertically-polarized beams are rotated by 90°, so that all four beams become horizontally polarized. At this stage, both the horizontal and vertical components comprise the entire spectrum of the channels in the input WDM signals 101, 102.

Element 206 is a stacked plurality of birefringent waveplates with their optic axis oriented at selected angles to create a polarization interference filter. This type of element is sometimes referred to as a composite waveplate, or CWP. The CWP 206 has two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary (second) part of the input spectrum, where V and H are vertical and horizontal polarizations, respectively. Further details of the design and the filtering mechanism of the CWP 206 are disclosed in the Applicants' U.S. patent application Ser. Nos. 08/739,424 and 08/780,291.

In the case of this N×M wavelength routing switch, the first eigen state carries a first set of optical frequencies that are coded with vertical polarization, and the second eigen state carries a complementary set of frequencies that are coded with horizontal polarization. Ideally, the CWP 206 functions as a polarization interference filter having a comb filter response curve with a substantially flat top or square wave spectral response. CWP is acting as a medium for spectral filtering and polarization rotation.

In FIG. 5a, two complete spectra $\lambda 1\alpha+\lambda 1\beta$ and $\lambda 2\alpha+\lambda 2\beta$ are input into the first CWP 206. In this control state, because $(\lambda 1\alpha,\lambda 2\alpha)$ and $(\lambda 1\beta,\lambda 2\beta)$ (are the two eigen states of the first CWP 206, $\lambda 1\alpha$ and $\lambda 2\alpha$ are rotated by 90°, while $\lambda 1\beta$ and $\lambda 2\beta$ pass through without changing their polarization. These two sets of channels are spatially separated by a second polarization separation element 202 (i.e., a birefringent element). This element 202 directs the horizontally-polarized signals upward and allows the vertically-polarized signals to pass through without deviation. This is because horizontal and vertical polarizations are considered extraordinary and ordinary waves in second birefringent element 202. By selecting the thickness of second polarization separation element 202 to be twice the thickness of the first polarization separation element 201, the horizontally-polarized signal $\lambda 2\alpha$ is combined with the vertically-polarized signal $\lambda 1\beta$ at the exit plane of the second polarization separation element 202. For the other set of optical channels, $\lambda 1\alpha$ travels upward and exits at the highest level of the second polarization separation element 202, while $\lambda 2\beta$ travels straight through element 202.

These three sets of optical signals pass through a second CWP 207 that has the same structure as the first CWP 206. The same polarization modulations occur again for the two eigen sets of the optical channels. $\lambda 1\alpha$ and $\lambda 2\alpha$ are rotated by 90°, while $\lambda 1\beta$ and $\lambda 2\beta$ pass without changing their polarization. In both cases, the spectra are further purified by passing through the second CWP 207. At the output plane of the second CWP 207, all six beams are vertically polarized, as shown in FIG. 5a. These three pairs of beams are intercepted by a second array of polarization rotators 205 having six elements. These six element are set to have an alternating pattern of ON and OFF pixels, so that one beam in each pair is rotated and the beam pairs become orthogonal again. These three orthogonally-polarized beam pairs are recombined by a third birefringent element 203 and exit to output ports 104, 103, and 105, respectively. In the control state shown in FIG. 5a, $\lambda 1\alpha$ goes into output port 104, $\lambda 1\beta$ and $\lambda 2\alpha$ go to output port 103, and $\lambda 2\beta$ goes to output port 105.

In the other control state illustrated in FIG. 5b, the polarization rotator arrays 204 and 205 are switched into their complementary states, in which ON becomes OFF and OFF becomes ON. In this configuration, the polarizations of the four beams become horizontal after passing through the first rotator array 204. This is orthogonal to the corresponding beams in FIG. 5a. When these horizontally-polarized beams pass through the first CWP 206, $\lambda 1\alpha$ and $\lambda 2\alpha$ are rotated by 90°, while $\lambda 1\beta$ and $\lambda 2\beta$ pass without changing their polarization. The second polarization separation element 202 again separates the four beams into six beams using the birefringent walk-off effect. Here, the horizontally polarized optical channels $(\lambda 1\beta,\lambda 2\beta)$ travel upward and $(\lambda 1\alpha,\lambda 2\alpha)$ pass straight through element 202. At the exit plane of element 202, $\lambda 2\beta$ and $\lambda 1\alpha$ are combined and exit at the center part of the element 202. In contrast, $\lambda 1\beta$ exits at the top and $\lambda 2\alpha$ exits at the bottom of element 202. All six beams pass again through the second CWP 207 to have their spectrums further purified and emerge with horizontal polarization. This is orthogonal to the result in FIG. 5a. These six horizontally-polarized beams are converted into three orthogonally-polarized pairs of beams when they pass through the second polarization rotator array 205, as previously discussed. These three orthogonal sets are finally recombined by the third birefringent element 203 to completes the second control state of operation. In this case, $\lambda 1\beta$ goes to output port 104, $\lambda 1\alpha$ and $\lambda 2\beta$ go to output port 103, and $\lambda 2\alpha$ goes to output port 105.

One feature of the present invention is that routing is accomplished while conserving substantially all optical energy available in the WDM signals 101, 102. That is to say, regardless of the polarization of the signals in the input WDM signal 101 and 102, both the horizontal and vertically polarized components are used and recombined in the output signals 103, 104 and 105. This feature results in very low loss through the wavelength switch. It should be noted from FIGS. 2a–2d that the output signals 103, 104 and 105 may comprise more than one channel and so themselves are WDM signals. Routing groups of channels may be useful in some circumstances. However, the preferred embodiment of the present invention can use a multiple-stage design to further decompose WDM signals 103, 104, and 105 as shown in FIGS. 3a–3b and FIGS. 4a–4d into smaller channel components that are spatially separated.

3. 3-D Design of an 2×3 Wavelength Switch.

Figure 6A:
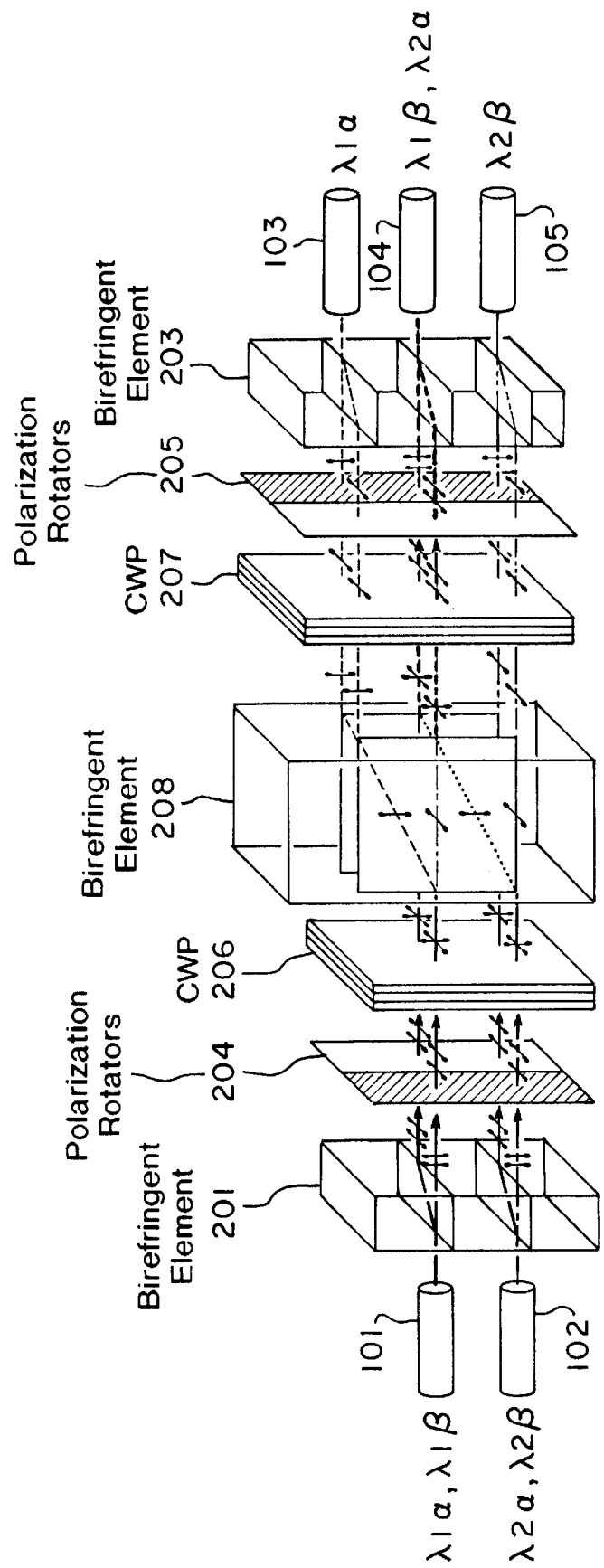
FIGS. 6a and 6b are simplified block diagrams of a 2×3 wavelength switch in a three-dimensional design showing the "0" and "1" control states, respectively.
Figure 6B:
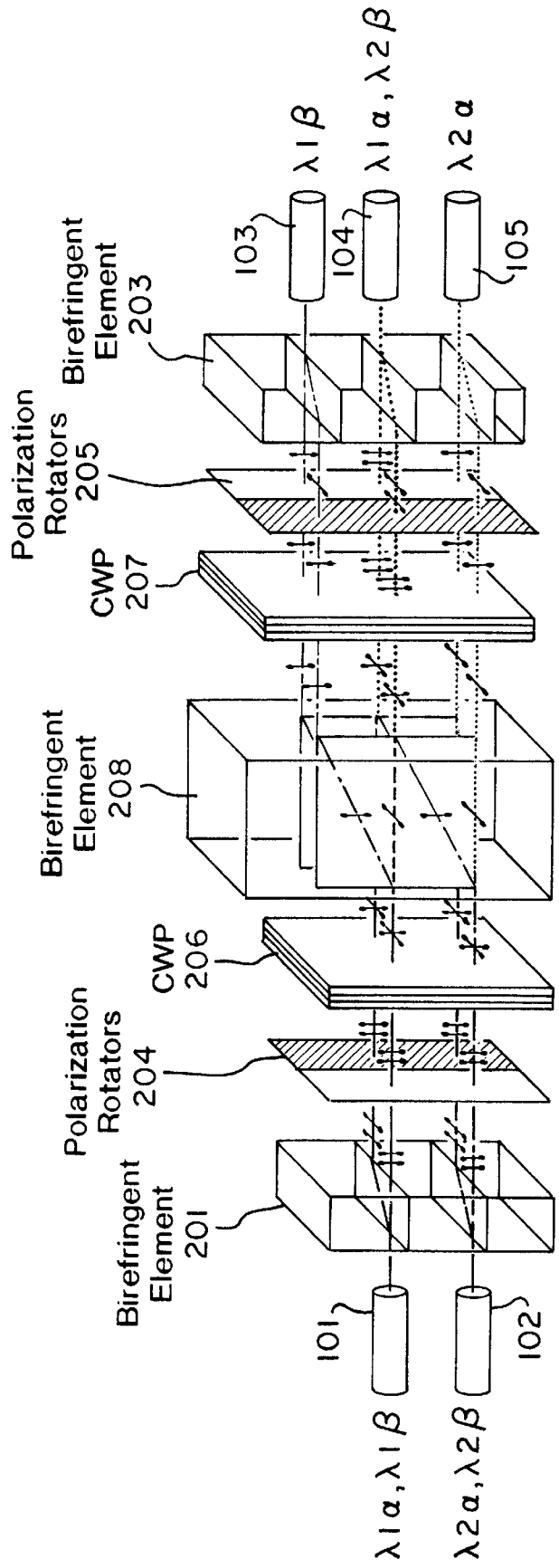

In the two-dimensional wavelength switch depicted in FIGS. 5a and 5b, all the optical paths are within the same plane. However, the design concept of the present invention is not limited to this structure. An example showing a three-dimensional design is illustrated in FIG. 6a for the first control state and FIG. 6b for the second control state. Two changes have been made with this structure as compared to the two-dimensional design shown in FIGS. 5a and 5b. In this embodiment, the second polarization dependent router 208 is oriented orthogonally to the first and third birefringent elements 201 and 203. The second change is the arrangement of the elements (or pixels) in the first and second polarization rotator arrays 204 and 205.

4. 2×2 Wavelength Switch Design

Figure 7A:
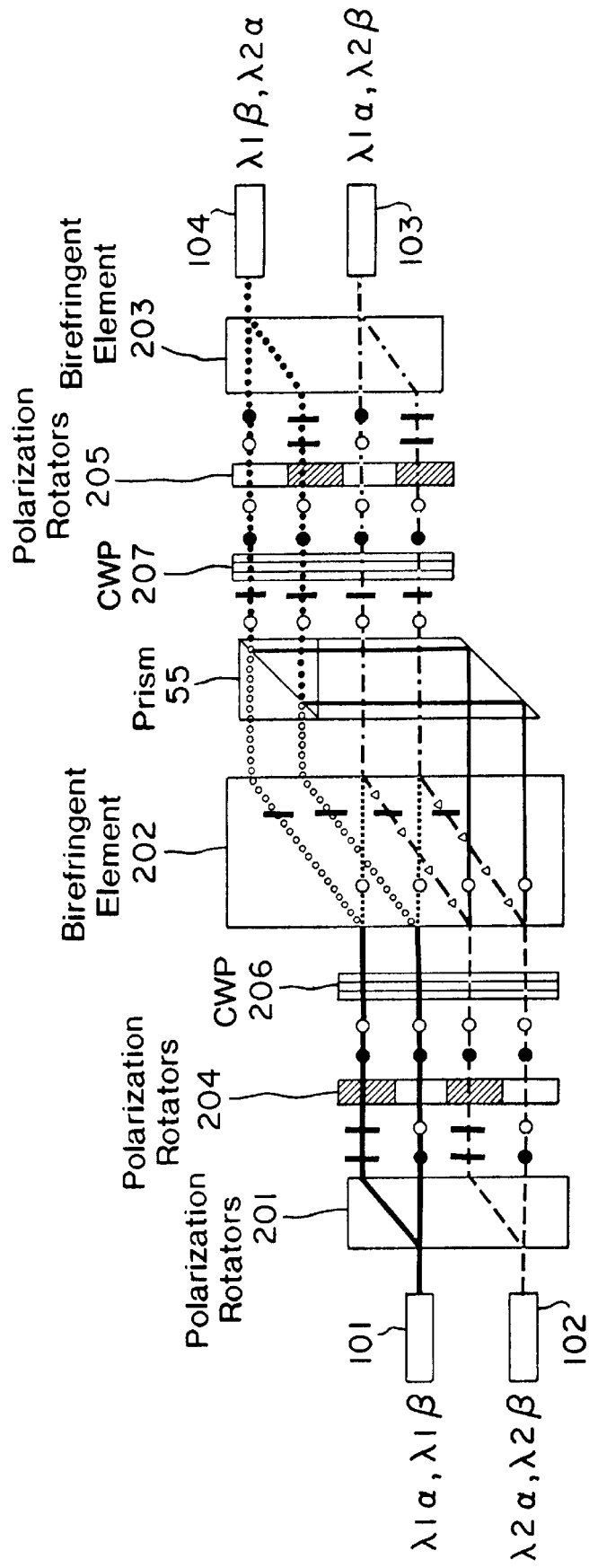
FIGS. 7a and 7b are simplified block diagrams of a 2×2 wavelength switch in a two-dimensional design showing the "0" and "1" control states, respectively.
Figure 7B:
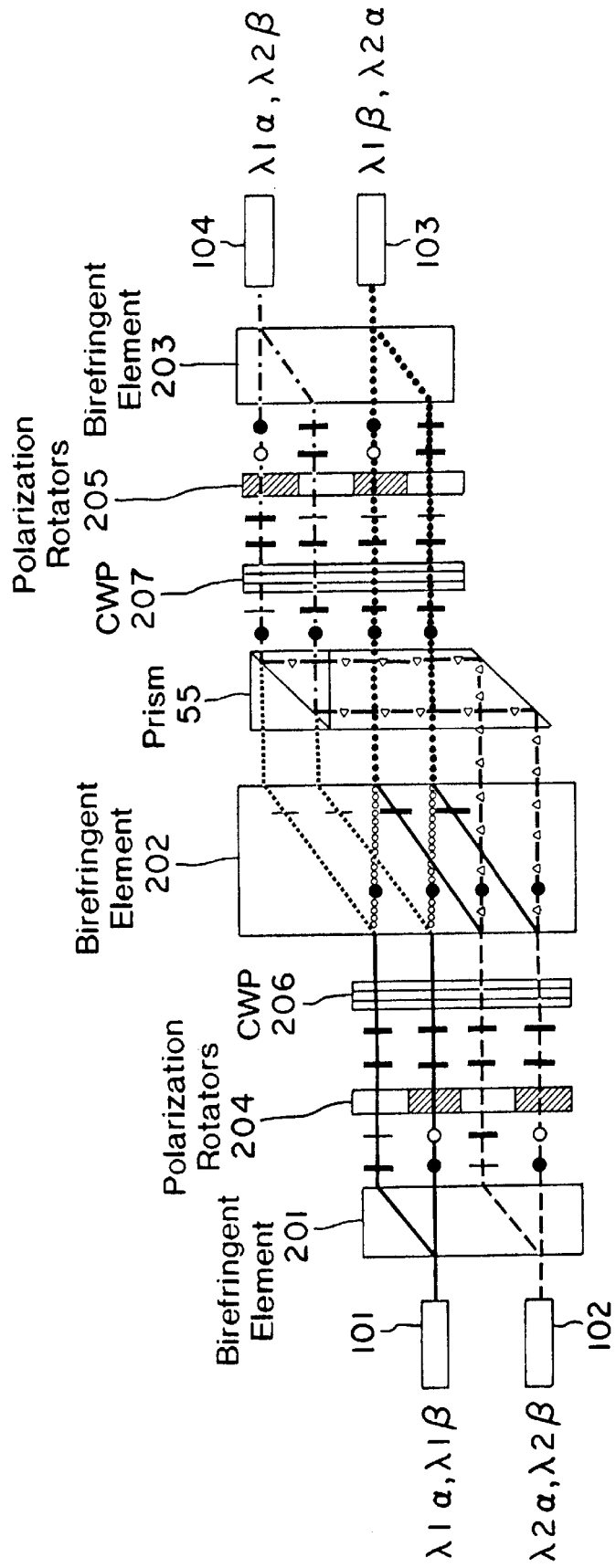

FIGS. 7a and 7b illustrate a two-dimensional embodiment of a 2×2 wavelength switch. Compared to the 2×3 wavelength switch shown in FIGS. 5a–5b, a polarization beam combiner integrated with a right angle prism 55 are used to deflect the lowest two beams from the second birefringent element 50 to the first output port 104. In this configuration, the input WDM signals ($\lambda 1\alpha, \lambda 1\beta$) and ($\lambda 2\alpha, \lambda 2\beta$) can be rearranged so that ($\lambda 1\alpha, \lambda 2\beta$) are routed to output port 104 and ($\lambda 2\alpha, \lambda 1\beta$) are routed to output port 103 in one control state, and ($\lambda 1\alpha, \lambda 2\beta$) are directed to output port 103 and ($\lambda 2\alpha, \lambda 1\beta$) are directed to output port 104 in the other control state.

Figure 8A:
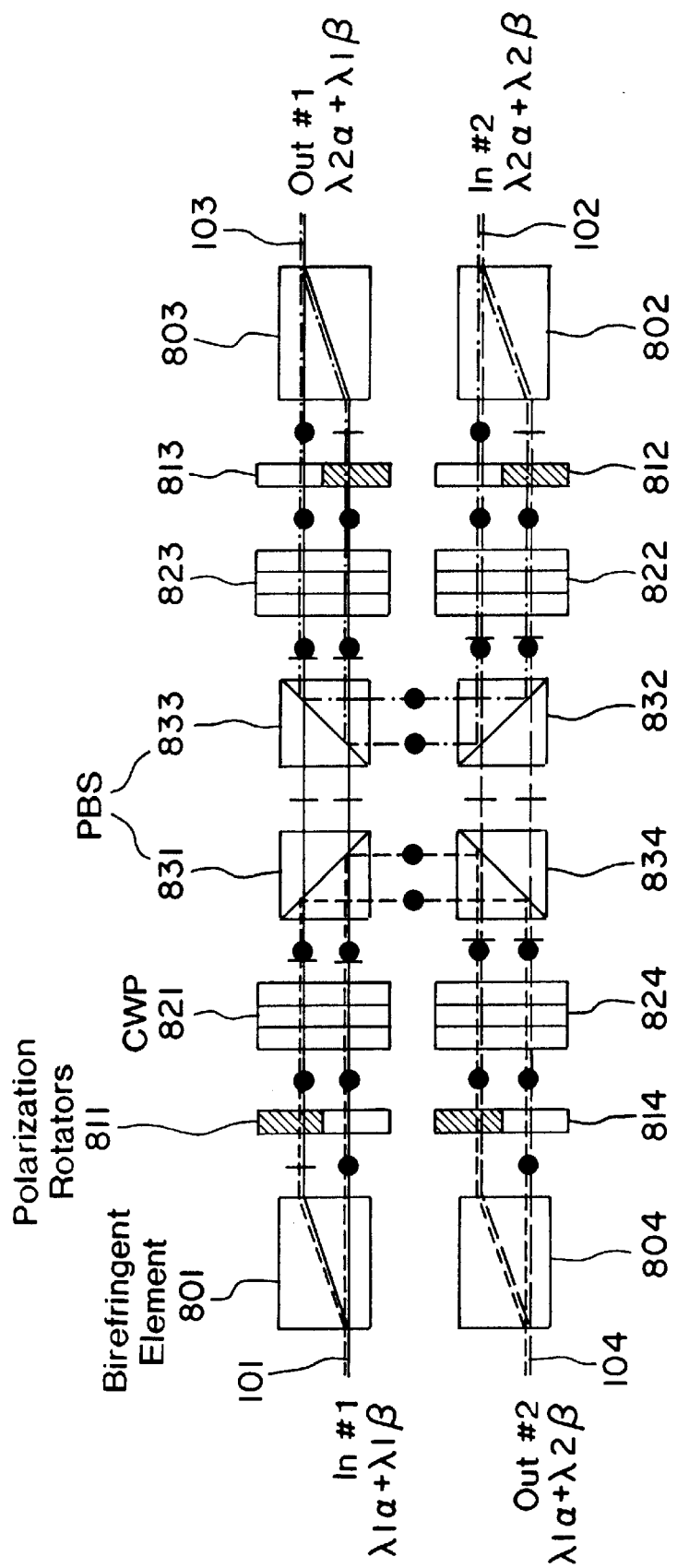
FIGS. 8a and 8b are simplified block diagrams showing the two control states of an alternative embodiment of a 2×2 optical wavelength router switch.
Figure 8B:
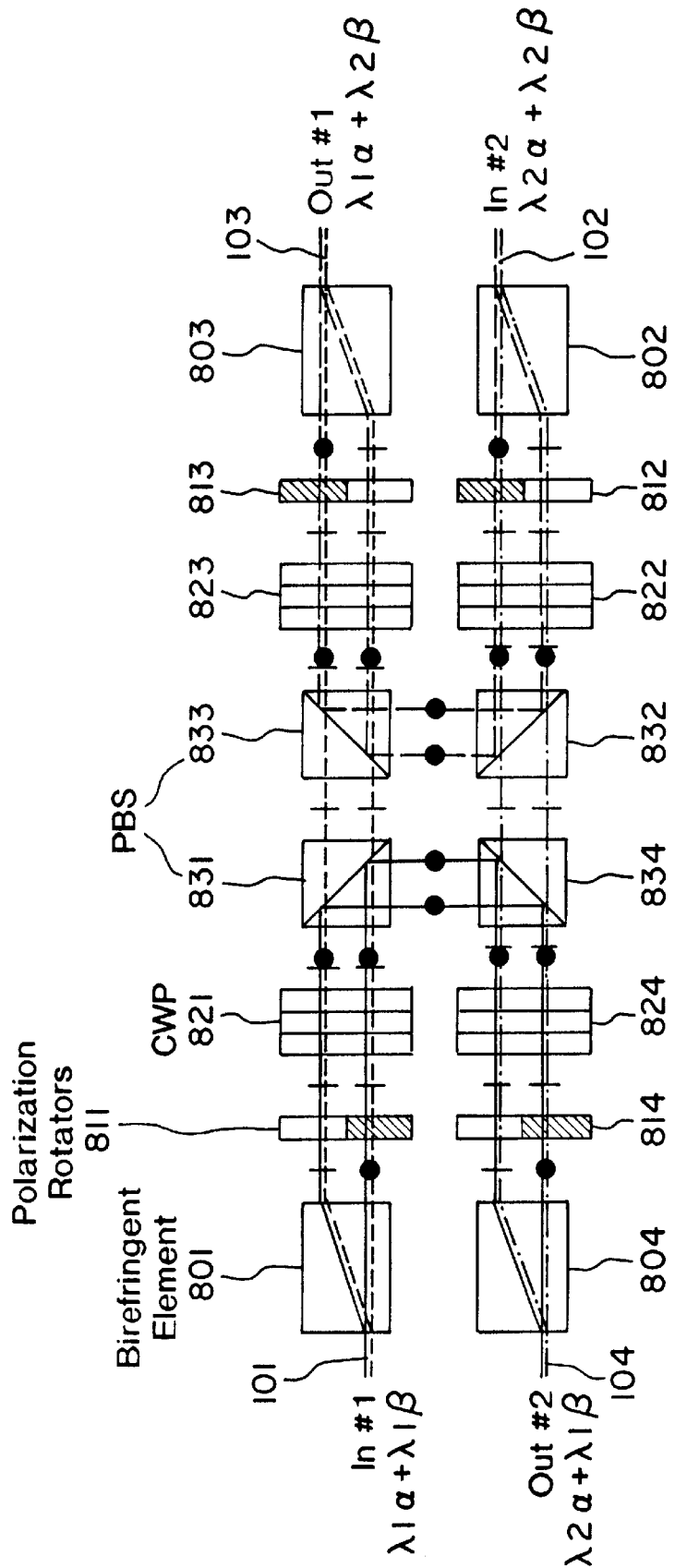

FIGS. 8a and 8b illustrate an alternative embodiment of a 2×2 wavelength switch incorporating a series of polarized beamsplitters (PBSs). FIG. 8a depicts the first control state in which the WDM signals ($\lambda 1\alpha, \lambda 1\beta$) and ($\lambda 2\alpha, \lambda 2\beta$) at input ports 101 and 102, respectively, are rearranged so that ($\lambda 2\alpha, \lambda 1\beta$) are directed to the first output port 103, and ($\lambda 1\alpha, \lambda 2\beta$) are directed to the second output port 104. In contrast, FIG. 8b depicts the second control state in which the input WDM signals ($\lambda 1\alpha, \lambda 1\beta$) and ($\lambda 2\alpha, \lambda 2\beta$) are rearranged so that ($\lambda 1\alpha, \lambda 2\beta$) are directed to the first output port 103 and ($\lambda 2\alpha, \lambda 1\beta$) are directed to the second output port 104.

In this embodiment, the birefringent elements 801–804, polarization rotator arrays 811–814, and CWPs 821–824 function in the same manner as discussed above. However, the second birefringent element in the previous embodiments has been replaced by a set of four polarized beamsplitters 831–834 that route each WDM channel to the appropriate output port based on the control state of the switch. For example in FIG. 8a, $\lambda 1\beta$ from the first input port 101 is carried by the vertically-polarized components of the beam pair exiting CWP 821, while $\lambda 1\beta$ is carried by the horizontally-polarized components of this beam pair. PBS 831 allows the horizontally-polarized components carrying $\lambda 1\beta$ to pass straight through, while the vertically-polarized components carrying $\lambda 1\alpha$ are reflected by 90 degrees to PBS 834.

Similarly in FIG. 8a, $\lambda 2\alpha$ from the second input port 102 is carried by the vertically-polarized components of the beam pair exiting CWP 822, while $\lambda 2\beta$ is carried by the horizontally-polarized components of this beam pair. PBS 832 allows the horizontally-polarized components carrying $\lambda 2\beta$ to pass straight through, while the vertically-polarized components carrying $\lambda 2\alpha$ are reflected by 90 degrees to PBS 833.

The other two PBSs 833 and 834 are used to recombine the WDM channels for the two output ports 103 and 104. For example in FIG. 8a, PBS 834 combines the vertically-polarized beam pair reflected by PBS 831 carrying $\lambda 1\alpha$ with the horizontally-polarized beam pair transmitted through PBS 832 carrying $\lambda 2\beta$. ($\lambda 1\alpha, \lambda 2\beta$) then exit at the second output port 104. Similarly, PBS 833 combines the vertically-polarized beam pair reflected by PBS 832 carrying $\lambda 2\alpha$ with the horizontally-polarized beam pair transmitted through PBS 831 carrying $\lambda 1\beta$. ($\lambda 2\alpha, \lambda 1\beta$) then exit at the first output port 103.

FIG. 8b shows the second control state of the embodiment in FIG. 8a. The states of the pixels in each of the polarization rotator arrays 811–814 have been reversed. As a result, $\lambda 1\beta$ is carried by the vertically-polarized beam pair reflected by PBS 831, while $\lambda 2\beta$ is carried by the vertically-polarized beam pair reflected by PBS 832. $\lambda 1\alpha$ is carried by the horizontally-polarized beam pair transmitted through PBS 831, and $\lambda 2\alpha$ is carried by the horizontally-polarized beam pair transmitted through PBS 832. $\lambda 1\alpha$ and $\lambda 2\beta$ are combined by BPS 833 and exit at the first output port 103. Similarly, $\lambda 2\alpha$ and $\lambda 1\beta$ are combined by PBS 834 and exit at the second output port 104.

The above disclosure sets forth a number of embodiments of the present invention. Other arrangements or embodiments, not precisely set forth, could be practiced under the teachings of the present invention and as set forth in the following claims.

We claim:

1. A method of switchably routing wavelength division multiplexed (WDM) optical signals according to an external control state, said method comprising the steps of:

providing at least one first input/output (I/O) port receiving a WDM optical signal;

providing a plurality of second I/O ports;

spatially decomposing the WDM signal received at said first I/O port into first and second beams having orthogonal polarizations with respect to each other;

rotating the polarization of at least one of said first and second beams such that both beams have substantially the same polarization determined by the control state;

demultiplexing said first and second beams of same polarization through a wavelength filter having a polarization-dependent optical transmission function such that said first beam decomposes into third and fourth beams with their polarizations orthogonal to each other, and said second beam decomposes into fifth and sixth beams with their polarizations orthogonal to each other; wherein said third and fifth beams carry a first predetermined spectral band at a first polarization, and said fourth and sixth beams carry a second predetermined spectral band at a second polarization; wherein said first and second spectral bands are substantially complementary and said first and second polarizations are substantially orthogonal;

spatially routing said third, fourth, fifth, and sixth beams based on their polarizations;

rotating the polarizations of selected ones of said third, fourth, fifth, and sixth beams, such that said fifth and sixth beams are orthogonally polarized with respect to said third and fourth beams;

spatially recombining said third and fifth beams containing said first spectral band, and spatially recombining said fourth and sixth beams containing said second spectral band; and coupling said first spectral band to a selected one of said second I/O ports and said second spectral band to another selected one of said second I/O ports.

2. The method of claim 1 further comprising the additional step after said spatial routing step of passing said routed third, fourth, fifth, and sixth beams through a second wavelength filter having substantially the same transmission function as said first wavelength filter, such that said third, fourth, fifth, and sixth beams exit said second wavelength filter with substantially the same polarization.

3. The method of claim 1 wherein the step of spatially decomposing the WDM optical signal uses a first birefringent element.

4. The method of claim 1 wherein the step of spatially routing said third, fourth, fifth, and sixth beams uses a second birefringent element.

5. The method of claim 1 wherein the step of recombining said third, fourth, fifth, and sixth beams uses a third birefringent element.

6. The method of claim 1 wherein the step of rotating the polarization of at least one of said first and second beams further comprises passing said first and second beams through a polarization rotator array having a plurality of pixels for selectively rotating the polarization of said first and second beams.

7. The method of claim 1 wherein the step of rotating the polarizations of said third, fourth, fifth, and sixth beams further comprises passing said third, fourth, fifth, and sixth beams through a polarization rotator array having a plurality of pixels for selectively rotating the polarizations of said third, fourth, fifth, and sixth beams.

8. The method of claim 1 wherein said wavelength filter comprises a stacked plurality of birefringent waveplates with each waveplate oriented in a predetermined direction.

9. A method of switchably routing wavelength division multiplexed (WDM) optical signals according to an external control state, said method comprising the steps of:
   providing an array of N input ports, with each of said input ports receiving a WDM optical signal;
   providing an array of M output ports;
   spatially decomposing the WDM signal received at each of said input ports into N pairs of first and second beams having orthogonal polarizations with respect to each other;
   rotating the polarization of at least one of said first and second beams in each pair, such that both beams have substantially the same polarization determined by the control state;
   demultiplexing each pair of first and second beams through a wavelength filter to create N sets of beams, with each set having a third, fourth, fifth, sixth beam; said wavelength filter having a polarization-dependent optical transmission function such that said first beam decomposes into third and fourth beams with their polarizations orthogonal to each other, and said second beam decomposes into fifth and sixth beams with their polarizations orthogonal to each other; wherein said third and fifth beams carry a first predetermined spectral band at a first polarization, and said fourth and sixth beams carry a second predetermined spectral band at a second polarization; wherein said first and second spectral bands are substantially complementary and said first and second polarizations are substantially orthogonal;
   spatially routing said third, fourth, fifth, and sixth beams for each of said N sets based on their polarizations;
   spatially combining selected ones of said third, fourth, fifth, and sixth beams from different ones of said N sets to produce M pairs of beams;
   rotating the polarizations of selected ones of said M pairs of beams, such that each pair of beams is orthogonally polarized; and
   spatially recombining each of said M pairs of beams to produce M output beams at said output ports.

10. The method of claim 9 further comprising the additional step after said spatial routing step of passing said N sets of beams through a second wavelength filter having substantially the same transmission function as said first wavelength filter, such that said N sets of beams exit said second wavelength filter with substantially the same polarization.

11. The method of claim 9 wherein the step of spatially decomposing the WDM optical signal uses a first birefringent element.

12. The method of claim 9 wherein the steps of spatially routing and spatially combining said third, fourth, fifth, and sixth beams use a second birefringent element.

13. The method of claim 9 wherein the step of recombining said M pairs of beams uses a third birefringent element.

14. The method of claim 9 wherein the step of rotating the polarization of at least one of said first and second beams further comprises passing said first and second beams through a polarization rotator array having a plurality of pixels for selectively rotating the polarization of said first and second beams.

15. The method of claim 9 wherein the step of rotating the polarizations of said M pairs of beams further comprises passing said M pairs of beams through a polarization rotator array having a plurality of pixels.

16. The method of claim 9 wherein said wavelength filter comprises a stacked plurality of birefringent waveplates with each waveplate oriented in a predetermined direction.

17. A programmable wavelength routing switch comprising:
   a plurality of cascaded stages wherein each stage has an array of N input ports and M output ports, with each input port receiving an optical signal comprising a plurality of wavelength division multiplexed (WDM) channels, wherein said stage divides said received optical signals into divided optical signals comprising a subset of said channels, and routes said divided optical signals to selected output ports in response to a control signal applied to each stage, and wherein at least one of said stages includes:
   (a) means for spatially separating each received optical signal into a horizontally polarized component along a first optical path and a vertically polarized component along a second optical path;
   (b) means for programmably rotating the polarization of each component of the separated optical signal;
   (c) a wavelength filter coupled to receive the programmably rotated components, the wavelength filter having a polarization-dependent optical transmission function such that the filtered first optical path comprises a first set of channels with vertical polarization and a second set of channels with horizontal polarization, and the filtered second optical path comprises the first set of channels with horizontal polarization and the second set of channels with vertical polarization, wherein the first and second sets of channels are substantially complementary;
   (d) means for spatially separating each of the first and second optical paths into horizontally polarized and vertically polarized components;
   (e) means for combining the horizontally polarized component of the first optical path with the vertically polarized component of the second optical path to output said second set of channels to a selected one of said output ports determined by said control signal; and
   (f) means for combining the vertically polarized component of the first optical path with the horizontally polarized component of the second optical path to output said first set of channels to a selected one of said output ports determined by said control signal.

18. The optical wavelength routing switch of claim 17 wherein the plurality of cascaded stages comprises:

a first stage for dividing the WDM signal into a plurality of first stage optical signals at said output ports of said first stage, wherein each first stage optical signal comprises at least one and less than all of the channels in the WDM signal; and a second stage for dividing each of said first stage optical signals into a plurality of second stage optical signals at said output ports of said second stage, wherein each second stage optical signal comprises a subset of the channels received from one of said first stage optical signals.

19. The optical wavelength routing switch of claim 18 further comprising:

a third stage for dividing each of said second stage optical signals into a plurality of third stage optical signals at said output ports of said third stage, wherein each third stage optical signal comprises a subset of the channels received from one of said second stage optical signals.

* * * * *

UNITED STATES PATENT AND TRADEMARK OFFICE
CERTIFICATE OF CORRECTION

PATENT NO. : 6,097,518
DATED : August 1, 2000
INVENTOR(S) : Wu et al.

It is certified that error appears in the above-identified patent and that said Letters Patent is hereby corrected as shown below:

Column 1,
Line 2, insert the heading, -- Goverment Interests --

After the heading, please insert the following,
-- The invention was made with Government support under Contract DARPA II: DAAH01-97-C-R308 awarded by U.S. Army Missile Command, AMSMI-AC-CRAY, Redstone Arsenal, AL 35898. The Government has gertian rights in the invention. --

Signed and Sealed this

Thirtieth Day of October, 2001

Attest:

NICHOLAS P. GODICI
Attesting Officer    Acting Director of the United States Patent and Trademark Office